United States Patent
Baudry et al.

(10) Patent No.: US 6,849,105 B2
(45) Date of Patent: Feb. 1, 2005

(54) METHOD AND INSTALLATION FOR TREATING EFFLUENT GAS CONTAINING HYDROCARBONS

(75) Inventors: Yvan Baudry, Merignac (FR); Jean-Pierre Lambert, Bordeaux (FR); Bernard Delperier, Martignas sur Jalles (FR); Jean-François Potin, Fontenailles (FR)

(73) Assignee: Snecma Propulsion Solide, Le Haillan Cedex (FR)

( * ) Notice: Subject to any disclaimer, the term of this patent is extended or adjusted under 35 U.S.C. 154(b) by 0 days.

(21) Appl. No.: 10/265,204

(22) Filed: Oct. 4, 2002

(65) Prior Publication Data

US 2003/0101869 A1 Jun. 5, 2003

(30) Foreign Application Priority Data

Dec. 5, 2001 (FR) ............................................ 01 15697

(51) Int. Cl.[7] ............................................... B01D 53/14
(52) U.S. Cl. ............................. 95/94; 95/187; 95/217; 95/229; 95/239; 96/234; 96/275; 96/323; 261/DIG. 54
(58) Field of Search ......................... 96/234, 323, 275; 95/237, 239, 92, 94, 216, 217, 187, 229; 261/DIG. 54

(56) References Cited

U.S. PATENT DOCUMENTS

| | | | | |
|---|---|---|---|---|
| 1,760,335 A | * | 5/1930 | Becker | 95/193 |
| 1,766,196 A | * | 6/1930 | Sharples | 95/189 |
| 2,129,787 A | * | 9/1938 | Schmalenbach | 95/189 |
| 2,794,515 A | * | 6/1957 | Brandes et al. | 95/209 |
| 3,403,495 A | * | 10/1968 | Jaasma | 95/199 |
| 3,448,562 A | * | 6/1969 | Wisting | 95/210 |
| 3,855,337 A | * | 12/1974 | Foral et al. | 95/191 |
| 4,066,423 A | * | 1/1978 | McGill et al. | 95/92 |
| 4,102,983 A | * | 7/1978 | Yamase et al. | 95/193 |
| 4,263,019 A | * | 4/1981 | Minkkinen | 95/190 |
| 4,276,058 A | * | 6/1981 | Dinsmore | 95/93 |
| 4,286,971 A | * | 9/1981 | Burcaw et al. | 95/189 |
| 4,923,485 A | * | 5/1990 | Horoldt et al. | 95/208 |

FOREIGN PATENT DOCUMENTS

| | | |
|---|---|---|
| GB | 790987 | 2/1958 |
| WO | WO 98/01216 | 1/1998 |
| WO | WO 98/03247 | 1/1998 |

* cited by examiner

*Primary Examiner*—Duane S. Smith
(74) *Attorney, Agent, or Firm*—Weingarten, Schurgin, Gagnebin & Lebovici LLP

(57) ABSTRACT

Prior to passing through pumping apparatus effluent gas containing hydrocarbons is subjected to washing by being sprayed with aromatic type oil in oil-recirculating washing apparatus. Polycyclic aromatic hydrocarbons contained in the effluent gas are trapped by being absorbed in the oil. The method is suitable for treating effluent gas coming from an installation for chemical vapor deposition or infiltration using a reagent gas containing a precursor for pyrolytic carbon, or else coming from a cementation installation.

29 Claims, 2 Drawing Sheets

METHOD AND INSTALLATION FOR TREATING EFFLUENT GAS CONTAINING HYDROCARBONS

BACKGROUND OF THE INVENTION

The invention relates to treating effluent gas containing polycyclic aromatic hydrocarbons.

The field of application of the invention is more particularly that of treating effluent gas produced by industrial installations for chemical vapor deposition or infiltration to form a deposit of pyrolytic carbon on substrates or to densify porous substrates with a matrix of pyrolytic carbon.

Such installations are very well known. Substrates for coating or densifying with pyrolytic carbon are placed in an oven into which a reagent gas containing one or more precursors of said carbon is introduced. The precursor gas is a hydrocarbon, typically methane, propane, or a mixture of both. The pressure and the temperature in the oven are adjusted so as to cause the coating or the matrix of pyrolytic carbon to be produced by the precursor gas decomposing (cracking) on coming into contact with the substrates. The effluent gas containing by-products of the reaction is extracted continuously from the oven by pumping.

The by-products of the reaction comprise organic compounds having a very high solidification temperature, in particular polycyclic aromatic hydrocarbons (PAHs) such as, in particular: naphthalene, pyrene, anthracene, acenaphthylene, . . . . On condensing, these reaction by-products form tars which tend to become deposited in the outlet pipework from the oven as the effluent gas cools. These tars are also to be found in the pumping apparatus, e.g. in the oil of vacuum pumps or in condensates from steam ejectors.

Similar problems can be encountered with industrial installations other than ovens for chemical vapor deposition or infiltration but that also make use of hydrocarbons as reagent gas, for example cementation ovens.

OBJECT AND BRIEF SUMMARY OF THE INVENTION

An object of the invention is to provide a method of treating effluent gas containing tars, in particular polycyclic aromatic hydrocarbons, to avoid clogging pipework or polluting the environment with these tars.

This object is achieved by a method whereby, in accordance with the invention, the effluent gas is subjected to washing by spraying aromatic oil prior to passing through pumping apparatus.

Compared with other gas washing techniques, spray washing serves to limit head loss and to minimize the formation of tar deposits on walls, as might happen when using washing columns with plates.

The washing oil used must remain in the liquid phase during the washing process so as to avoid producing vapor that is entrained by the effluent gas. Specifically with effluent gas from an oven for chemical vapor deposition or infiltration, the pressure of the effluent gas at the outlet from the oven is relatively low. The washing oil must therefore present low vapor pressure, preferably less than 100 Pascals (Pa) at 0° C.

In addition, the composition of the oil must enable the tars that need to be trapped to be absorbed well. That is why it is preferable to select a mineral oil of the aromatic type having low PAH content, and capable of absorbing and dissolving PAHs.

According to a feature of the method, the effluent gas is washed by injecting oil into a stream of effluent gas travelling along a spray column, e.g. a Venturi column.

Advantageously, the oil circulates continuously between a recirculation tank collecting the PAH-filled oil and at least one nozzle for spraying oil into a stream of effluent gas. The oil is preferably cooled by passing through a heat exchanger on its path between the tank and the spray nozzle(s).

According to another feature of the method, the effluent gas is pumped by passing the washed gas through at least one steam ejector-condenser. Advantageously, at least a portion of the gas from the ejector-condenser is used as combustion gas for apparatus producing the steam that is fed to the ejector-condenser.

Also advantageously, the condensate coming from the ejector-condenser is treated by being passed over activated carbon in order to recover light hydrocarbons, in particular benzoles, and any residual PAH contained in the condensate.

Another object of the invention is to provide an installation for implementing the above-defined method.

This object is achieved by an installation which comprises gas pumping apparatus and oil washing apparatus interposed between an inlet for effluent gas to be treated and the pumping apparatus, and in which the oil washing apparatus comprises a spray column having its inlet connected to receive effluent gas so as to enable it to flow along the column, and having means for injecting oil into the spray column.

The spray column may be a Venturi column.

According to a feature of the installation, the washing apparatus includes an oil recirculation tank having: an inlet connected to the spray column; an oil outlet connected to the means for injecting oil into the column so as to cause the oil to circulate continuously between the recirculation tank, the oil injection means, and the spray column; and an outlet for washed gas connected to the pumping apparatus.

Advantageously, the washing apparatus includes a heat exchanger placed on the path of the effluent gas downstream from the spray column, and means for feeding the heat exchanger with a cooling fluid.

Also advantageously, the washing apparatus includes a heat exchanger placed between the oil outlet and the oil injector means in order to cool the oil prior to injecting it into the column.

According to another feature of the installation, the pumping apparatus comprises at least one steam ejector-condenser.

Advantageously, the steam is produced in a boiler having fuel gas feed means connected to a gas outlet from the ejector-condenser.

The ejector-condenser may be of the indirect condenser type. Means are preferably provided for treating the condensate coming from the ejector-condenser in order to recover hydrocarbons contained therein, e.g. means for adsorption on activated carbon.

In a variant, the ejector-condenser may be of the direct condenser type. The condensate coming from the condenser can then be treated by being passed through a stripping tower.

BRIEF DESCRIPTION OF THE DRAWINGS

The invention will be better understood on reading the following description given by way of non-limiting indication and made with reference to the accompanying drawings, in which.

DETAILED DESCRIPTION OF EMBODIMENTS

Figure 1:
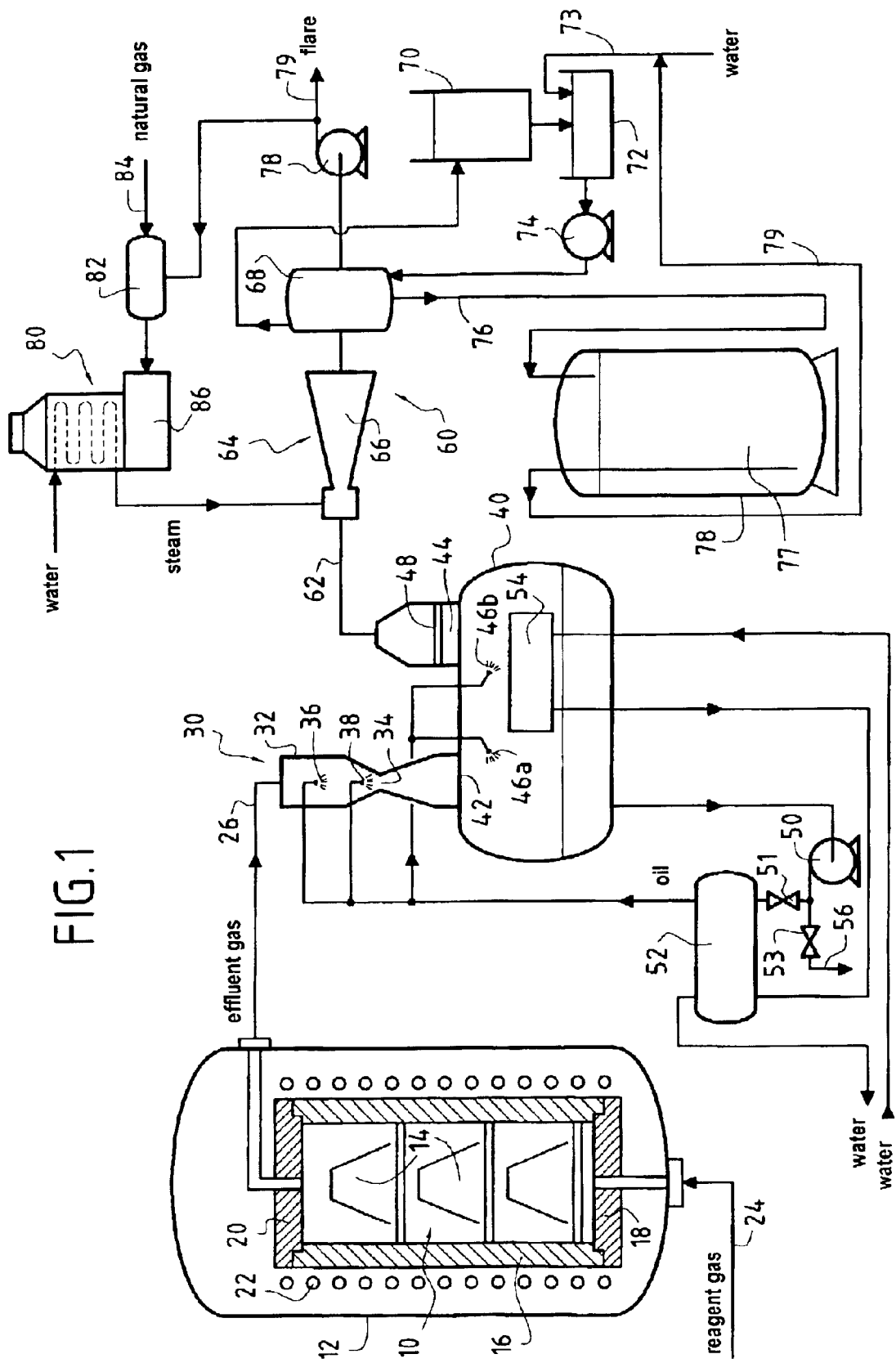
FIG. 1 shows an industrial installation for chemical vapor infiltration provided with an installation for treating effluent gas constituting an embodiment of the invention.

FIG. 1 is a highly diagrammatic representation of an installation for chemical vapor infiltration that is intended more particularly for densifying porous substrates with a pyrolytic carbon matrix.

An oven 10 housed in an enclosure 12 receives porous substrates 14 that are to be densified, e.g. fiber preforms for parts that are to be made out of carbon matrix composite material.

The oven 10 is defined by a wall 16 forming a susceptor, e.g. made of graphite, and by a bottom 18 and a cover 20. The susceptor 16 is coupled with an induction coil 22, the oven being heated essentially by radiation from the susceptor which is heated by being coupled inductively with the induction coil.

A reagent gas is inserted via a pipe 24 passing through the bottom 18 of the oven, for example. The reagent gas comprises one or more carbon precursors in gaseous form, in particular methane and/or propane. The effluent gas is extracted from the oven through the cover 20 by means of a pipe 26 connected to pumping apparatus which ensures that gas flows through the oven and which maintains the desired low pressure inside the oven.

Such an installation is well known per se so there is no point in giving a more detailed description.

A matrix of pyrolytic carbon is formed within the pores of the substrates by the gaseous precursor(s) decomposing. Reaction by-products are also formed and these are collected in the effluent gas together with a fraction of the reagent gas which has not reacted and together with the hydrogen gas $H_2$ that comes from decomposing the gaseous precursor of carbon.

The reaction by-products comprise in particular the following organic compounds:

residual reagent gas and hydrogen gas;
unsaturated hydrocarbons, mainly ethylene and acetylene; these do not present any particular problems and can be burnt at the outlet;
benzoles such as benzene, toluene, xylene (BTX); and
polycyclic aromatic hydrocarbons, such as naphthalene, pyrene, anthracene, acenaphthylene, . . . .

PAHs present greater difficulty because of their high solidification temperature which facilitates condensation thereof, causing tars to become deposited in the outlet pipes from the oven as soon as the temperature of the effluent gas decreases.

Thus, the invention provides an installation for treating effluent gas, said installation comprising apparatus 30 for washing the effluent gas by means of oil, which apparatus is interposed between the outlet for effluent gas from the oven 10 and the pumping apparatus 60.

The oil washing apparatus 30 comprises a spray column 32 whose top end is connected to the pipe 26. The column 32 is a column having a Venturi 34 formed by a constriction in the flow section it provides for gas. At its bottom end, the column 32 communicates with a gas inlet 42 formed through the top wall of an oil recirculation tank 40 in the vicinity of one end thereof. A gas outlet 44 also opens through the top wall of the tank 40, in the vicinity of its other end, and communicates by means of a pipe 62 with the pumping apparatus 60.

An oil outlet is formed in the bottom portion of the tank 40 and is connected to a pump 50 which extracts oil from the tank 40 in order to feed nozzles 36, 38 disposed substantially on the axis of the column 32, the oil being caused to pass through a heat exchanger 52. Additional nozzles 46a and 46b may be disposed in the tank 40, with the nozzles 46a and 46b being fed with oil downstream from the heat exchanger 52, in parallel with the nozzles 36 and 38.

The heat exchanger 52 has a cooling fluid passing therethrough, e.g. cold water, for the purpose of cooling the oil that comes from the tank 40. The cooling oil also passes through a heat exchanger 54, e.g. implemented in the form of plates and connected in series with the heat exchanger 52, being disposed inside the tank 40.

The heat exchanger 54 and the nozzles 46a and 46b are housed inside the tank between its gas inlet 42 and its gas outlet 44, above the level of the oil in the tank.

A droplet remover 48 may be mounted at the gas outlet 44 from the tank 40.

The oil washing apparatus 30 operates as follows.

The oil delivered to the nozzles 36 and 38 is sprayed into the stream of effluent gas passing through the column 32, this spraying being enhanced by the increase in the speed of the gas due to the presence of the Venturi 34. One of the nozzles, 36, may be provided in the top portion of the column 32 upstream from the Venturi, while the other nozzle, 38, is provided close to the throat of the Venturi. It would also be possible to use only one nozzle, 36 or 38.

The sprayed oil absorbs a large fraction of the tars conveyed by the effluent gas, in particular the polycyclic aromatic hydrocarbons (PAHs) which are entrained into the bath of oil contained in the tank 40.

The oil used must present vapor pressure that is low enough to ensure that it does not vaporize at the pressure which exists at the outlet from the oven 10 so as to avoid loading the effluent gas with oil vapor. As an indication, the pressure inside the oven 10 during the various stages of the infiltration process may be less than about 0.2 kilopascals (kPa). The viscosity of the oil must also be sufficiently low to enable it to be put into circulation and to enable a mist to be formed at the outlet from the nozzles.

That is why the oil is preferably an aromatic type mineral oil having vapor pressure of less than 100 Pa at 0° C., and capable of absorbing and dissolving PAHs.

An oil based on xylenes, such as the synthetic oil sold under the name "Jaritherm AX 320" by the French supplier Elf Atochem and constituted by 85% by weight monoxylyxylene and 15% by weight di-xylyxylene has been found to be effective. That oil has viscosity of 60 centipoises at 0° C. and a vapor pressure at 0° C. of less than 100 Pa.

By way of comparison, an oil based on paraffin has been found to be ineffective because of its inability to dissolve PAHs.

The heat exchangers 52 and 54 are fed with cold water at a temperature near 0° C. in order to cool as much as possible the oil injected by the nozzles 36 and 38, and also by the nozzles 46a and 46b on the path between the inlet and the outlet of gas passing through the tank 40.

The heat exchanger 54 encourages condensation of tar still present in the effluent gas leaving the column 32.

The droplet remover 48, e.g. of the baffle type, contributes to breaking up a mist present at the outlet from the tank 40 so as to separate out droplets and cause them to coalesce, thereby enabling them to be collected in the bath of oil.

The tank may be emptied at least in part via the outlet from the pump 50 by closing a valve 51 mounted in a pipe connecting the outlet of the pump 50 to the heat exchanger 52 while opening a valve 53 mounted in a pipe connecting the output from the pump 50 to an outlet 56 for waste oil. The collected waste oil can be destroyed by being incinerated, and clean oil can be added into the tank 40.

The trapping performed by the oil washing apparatus 30 serves to eliminate a maximum amount of tar such as PAHs. Only the lightest aromatic hydrocarbons (benzenes, monocyclic hydrocarbons) might remain in the washed effluent gas, but they do not present any risk of clogging the pipes since their vapor pressure is higher.

The pumping apparatus 60 comprises an ejector-condenser 64, or a plurality of similar ejector-condensers connected in series (only one being shown in the figure).

The ejector-condenser 64 comprises an ejector portion 66 fed with steam from a boiler 80, and a condenser portion 68 situated downstream from the ejector. The condenser 68 is an indirect condenser, the gas coming from the ejector being brought into contact with pipes conveying a cooling fluid, e.g. cold water.

After passing through the condenser 68, the water is taken to a cooling tower 70 where it can be collected in a tank 72 into which additional water is added by means of a pipe 73 so as to enable continuous circulation to be performed by a pump 74 inserted in a pipe connecting the tank 72 to the condenser 68.

The condensate collected in an outlet pipe 76 from the condenser contains benzoles such as benzene, toluene, xylene (BTX) together with any residual PAH dissolved in the water coming from condensation of the steam from the ejector 66. The condensate is treated by adsorption on a fixed bed 77 of activated carbon contained in an adsorption column 78. The pipe 76 is connected to the top of the column 78 and purified water is collected from the bottom of the column from which it can be taken by a pipe 79 to the tank 72. A plurality of adsorption columns with activated carbon beds may be connected in series.

At the outlet from the condenser, the effluent gas passes through a pump 78. It is possible to use a water ring pump cooled by a heat exchanger so that the gas extracted from the treatment installation is practically at ambient temperature.

The extracted gas contains essentially unsaturated hydrocarbons in addition to residual reagent gas and hydrogen gas $H_2$ coming from the oven 10. It can be directed to a burn-off flare by a pipe 79 and at least part of it can be used as fuel gas for the boiler 80. If it is used as fuel gas, it is mixed in a buffer cylinder 82 with a gaseous fuel such as natural gas delivered by a pipe 84. The buffer cylinder 82 feeds the burners 86 of the boiler 80.

Figure 2:
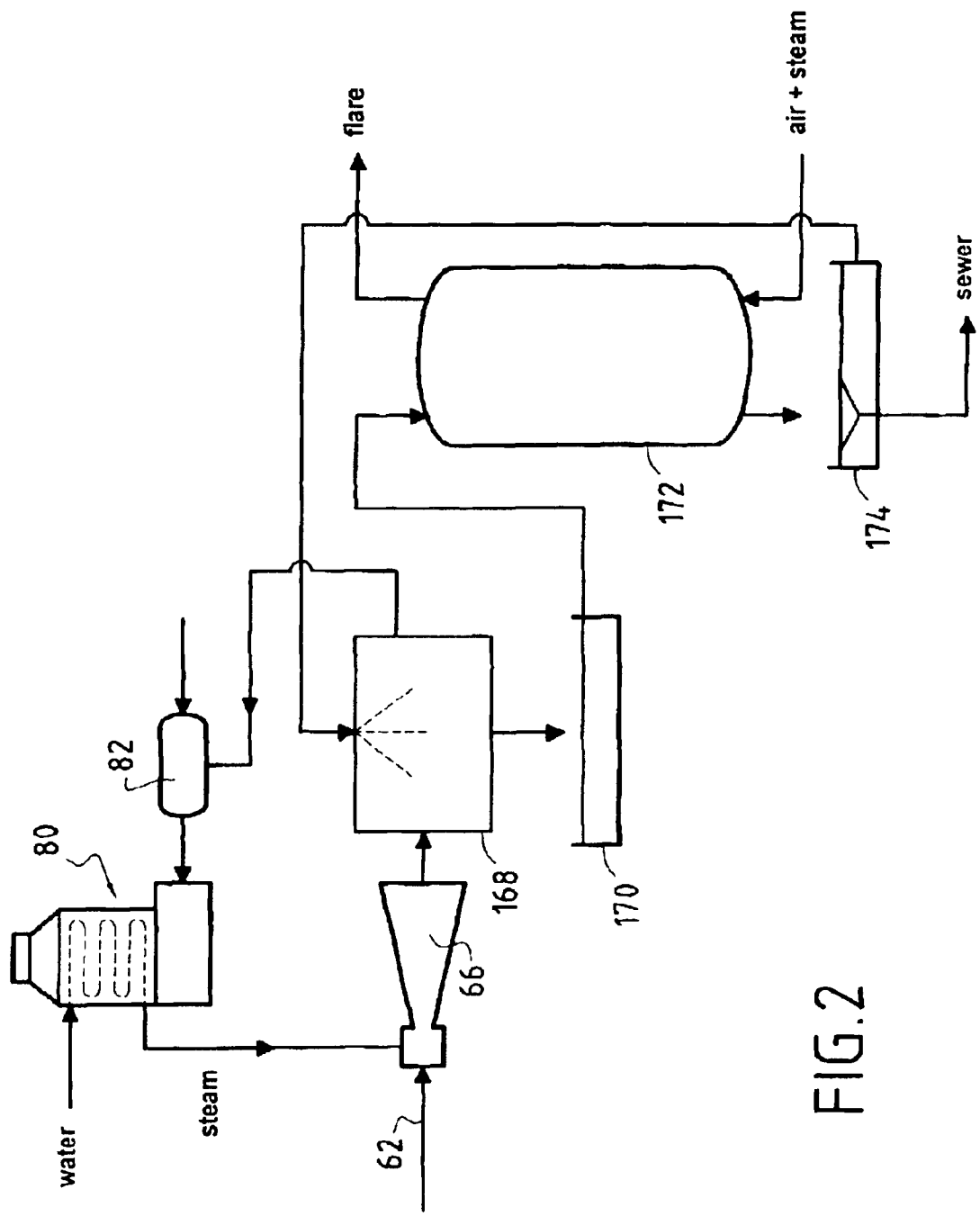
FIG. 2 shows a portion of an installation for treating effluent constituting another embodiment of the invention.

In a variant, as shown in FIG. 2, the ejector-condenser 64 (or each of them when a plurality are connected in series) comprises a direct condenser 168 (instead of an indirect condenser) downstream from the ejector 66. Elements that are common to both embodiments of FIGS. 1 and 2 are given the same references and are not described in detail below.

The flow coming from the ejector 66 is put into direct contact with cooling water inside the condenser 168.

The condensate and the cooling water are collected in a vessel 170 prior to being taken to a stripping tower 172. The gas from the condenser 168 is taken to the buffer cylinder 82.

The stripping tower 172 is fed with steam and air. The steam may be taken from the boiler 80, in which case the boiler is dimensioned so as to be capable of feeding both the ejector 66 and the stripping tower.

The gas coming from the stripping tower, comprising air, steam, benzoles, and possibly some naphthalene is taken to a burn-off flare.

The liquid effluent from the stripping tower is collected in a tank 174. It is made up essentially of water which is recycled to the condenser 168 as cooling water. Excess water collected in the tank 174 contains only a very small quantity of benzoles and can be discharged into the sewers.

Although the description above relates to the invention being applied to an oven for densifying porous substrates with a matrix of pyrolytic carbon obtained by chemical gas infiltration, it can readily be seen that the invention is applicable to an industrial oven for coating substrates in pyrolytic carbon by chemical gas deposition, and more generally to industrial installations using hydrocarbons and discharging gaseous effluent containing tar such as PAHs, as can be the case in particular for cementation ovens.

The following tables give the results of analyses performed on oil and water after an installation of the kind shown in FIG. 1 had been in operation for various periods.

Table I gives the original composition of the washing oil (time of use=0), after 1231 hours (h) of operation in the installation, and after 2137 h of operation. This table also gives the initial volume of oil and the subsequently measured volumes, together with the mass of the absorbed PAHs.

It can be seen that the washing oil has large adsorption capacity, said oil being the above-mentioned "Jaritherm AX320".

Table II gives the quantities of hydrocarbons measured in the water at the inlet and the outlet of the column 78 for filtration by adsorption on activated carbon, after the installation had been in operation for 3500 h. This table also gives the phenol index, the pH, the turbidity, the total organic carbon content (COT), and the material in suspension.

It can be seen that activated carbon filtering is effective in eliminating the PAH residues and the benzoles in the condensates from the condenser 68.

TABLE I

| | Oil analysis results | | |
|---|---|---|---|
| Period of use (h) | 0 | 1231 h | 2137 h |
| PAH | | | |
| Naphthalene | 15.0 | 33500 | 40500 |
| Acenaphthylene | 1.0 | 30400 | 52000 |
| Acenaphthene | 0.1 | 828 | 1420 |
| Fluorene | 0.2 | 12200 | 19400 |
| Phenanthrene | 1.2 | 8600 | 11800 |
| Anthracene | 1.2 | 3060 | 4420 |
| Fluoranthene | 7.1 | 3400 | 4900 |
| Pyrene | 3.0 | 8600 | 12000 |
| Benzo (a) anthracene | 1.4 | 282 | 445 |
| Chrysene | 75.0 | 140 | 192 |
| Benzo (b) fluoranthene | 30 | 162 | 324 |
| Benzo (k) fluoranthene | 0.3 | 111 | 206 |
| Benzo (a) pyrene | 1.3 | 697 | 1335 |
| Dibenzo (a, h) anthracene | 0.5 | 160 | 198 |
| Ideno (1, 2, 3, cd) pyrene | 0.3 | 504 | 1114 |
| Benzo (ghi) perylene | 0.7 | 192 | 573 |
| Total PAH in milligrams per liter (mg/l) | 138.3 | 102836 | 150827 |
| Benzoles (mg/l) | | | |
| Benzene | | 530 | 670 |
| Toluene | — | 110 | 110 |
| Ethyl benzene | — | 20 | 20 |
| Xylenes | — | 20 | 20 |
| Total benzoles (mg/l) | 0.0 | 680 | 820 |
| Total hydrocarbons (mg/l) | 138.3 | 103516 | 151647 |
| Initial oil volume in liters (l) | 800 | 800 | 800 |

TABLE I-continued

|  | Oil analysis results | | |
| --- | --- | --- | --- |
| Period of use (h) | 0 | 1231 h | 2137 h |
| Measured volume (l) | 800 | 901 | 942 |
| Change in volume (l) | 0 | 101 | 142 |
| Weight of PAH (kg) | 0.11 | 98.65 | 138.79 |

TABLE II

|  | Water analysis results | |
| --- | --- | --- |
|  | Before filter | After filter |
| PAH micrograms per liter ($\mu$g/l) | | |
| Naphthalene | 9710 | 0.1 |
| Acenaphthylene | 1730 | 1 |
| Anthracene | 226 | 0.1 |
| Benzo (a) pyrene | 38 | 0.1 |
| Dibenzo (a, h) anthracene | 8.4 | 0.1 |
| Indeno (1, 2, 3, cd) pyrene | 16 | 0.1 |
| Total PAH ($\mu$g/l) | 11728.4 | 1.5 |
| Benzoles ($\mu$g/l) | | |
| Benzene | 15400 | <10 |
| Toluene | 1000 | <10 |
| Ethyl benzene | 1000 | <10 |
| Xylenes | 1000 | <10 |
| Total benzoles ($\mu$g/l) | 18400 | <40 |
| Total hydrocarbons ($\mu$g/l) | 30128.4 | <41.5 |
| Phenol index | <75 | <10 |
| pH | 7.25 | 7.55 |
| Turbidity in nephelometric turbidity units (NTU) | 7.3 | 1 |
| COT (mg/l) | 5.2 | 0.55 |
| Matter in suspension (mg/l) | 2 | 0.3 |

What is claimed is:

1. A method of treating effluent gas containing hydrocarbons, the method including the steps of:
    washing the effluent gas by spraying aromatic type oil having a vapor pressure of less than 100 Pa at 0° C.;
    trapping polycyclic aromatic compounds with the washing oil; and
    passing the treated gas through pumping apparatus.

2. A method according to claim 1, wherein the effluent gas is washed by injecting oil into a stream of effluent gas travelling along a spray column.

3. A method according to claim 1, further comprising the step of continuously circulating the washing oil between a recirculation tank collecting oil loaded with polycyclic aromatic hydrocarbons and at least one nozzle for spraying oil into the effluent gas stream.

4. A method according to claim 3, further comprising the step of cooling the washing oil on its path between the recirculation tank and the at least one spray nozzle.

5. A method according to claim 1, wherein the oil selected is based on xylenes.

6. A method according to claim 1, wherein the effluent gas is pumped by passing the gas through at least one steam ejector-condenser of the indirect condenser type.

7. A method according to claim 6, wherein the condensate from the ejector-condenser is treated by being passed over activated carbon in order to recover light hydrocarbons and any residual polycyclic aromatic hydrocarbons.

8. A method according to claim 1, wherein the effluent gas is pumped by being passed through at least one steam ejector-condenser of the direct condenser type.

9. A method according to claim 8, wherein the condensate from the ejector-condenser is treated by passing through a stripping tar.

10. A method according to claim 6, wherein at least a portion of the washed gas coming from the ejector-condenser is used as fuel gas for a device for producing steam feeding the ejector-condenser.

11. An industrial installation for chemical vapor deposition or infiltration to form a deposit comprising pyrolytic carbon on substrates or to densify porous substrates with a matrix containing pyrolytic carbon, the installation comprising:
    an oven having a reagent gas inlet and an effluent gas outlet;
    a gas pumping apparatus connected to the effluent gas outlet; and
    an oil washing apparatus interposed between the effluent gas outlet and the pumping apparatus, the oil washing apparatus comprising: a spray column having an inlet connected to receive effluent gas from the effluent gas outlet and enable the effluent gas to flow along the column; and means for injecting washing oil into the spray column.

12. An installation according to claim 11, wherein the spray column is a Venturi column.

13. An installation according to claim 11, wherein the washing apparatus includes an oil recirculation tank having: an inlet connected to the spray column; an oil outlet connected to the means for injecting oil into the column so as to cause the oil to circulate continuously between the recirculation tank, the oil injection means, and the spray column; and an outlet for washed gas connected to the pumping apparatus.

14. An installation according to claim 13, wherein the washing apparatus includes a heat exchanger placed on the path of the effluent gas downstream from the spray column, and means for feeding the heat exchanger with a cooling fluid.

15. An installation according to claim 13, including a heat exchanger interposed on the path of the oil between the recirculation tank and the spray column, and means for feeding the heat exchanger with a cooling fluid.

16. An installation according to claim 11, wherein the pumping apparatus comprises at least one steam ejector-condenser of the indirect condenser type.

17. An installation according to claim 16, including means for activated carbon treatment connected to a condensate outlet from the ejector-condenser.

18. An installation according to claim 11, wherein the pumping apparatus comprises at least one steam ejector-condenser of the indirect condenser type.

19. An installation according to claim 18, including a stripping tower connected to a condensate outlet from the ejector-condenser.

20. An installation according to claim 16, including a boiler for producing steam for the ejector-condenser, the boiler having fuel gas feed means connected to a gas outlet from the ejector-condenser.

21. A method of treating effluent gas containing hydrocarbons, the method including the steps of:
    washing the effluent gas by spraying aromatic type oil,
    trapping polycyclic aromatic compounds with the washing oil,
    passing the treated gas through a pumping apparatus to create an effluent gas stream, and continuously recirculating the washing oil with accumulated polycyclic aromatic compounds trapped therein between a recirculation tank collecting oil loaded with polycyclic aromatic compounds and at least one nuzzle for spraying oil into the effluent gas stream.

22. A method according to claim 21, further comprising the step of cooling the washing oil on its path between the recirculation tank and the at least one nozzle.

23. A method according to claim 21, wherein the aromatic oil has a vapor pressure of less than 100 Pa at 0° C.

24. A method according to claim 21, wherein the aromatic oil is based on xylenes.

25. A method for chemical vapor deposition or infiltration of pyrolytic carbon, the method comprising the steps of:

admitting a reagent gas containing at least one carbon precursor into an oven;

extracting low pressure effluent gas containing polycyclic aromatic compounds out of the oven; and washing the effluent gas by spraying aromatic type oil into a stream of effluent gas extracted from the oven.

26. A method as claimed in claim 25, wherein the washing oil is an aromatic type oil having a vapor pressure of less than 100 Pa at 0° C.

27. A method as claimed in claim 25, wherein said aromatic type oil is based on xylenes.

28. A method as claimed in claim 25, wherein said washing step is carried out by spraying the washing oil into a stream of effluent gas traveling along a Venturi column.

29. A method as claimed in claim 25, further comprising the step of continuously recirculating the washing oil with accumulated polycyclic aromatic compounds trapped therein between a recirculation tank collecting oil loaded with polycyclic aromatic compounds and at least one nozzle for spraying oil into the effluent gas stream.

* * * * *

UNITED STATES PATENT AND TRADEMARK OFFICE
CERTIFICATE OF CORRECTION

PATENT NO. : 6,849,105 B2
DATED : February 1, 2005
INVENTOR(S) : Yvan Baudry et al.

It is certified that error appears in the above-identified patent and that said Letters Patent is hereby corrected as shown below:

Column 6,
Table 1, line 53, "3o" should read -- 30.0 --; and

Column 9,
Line 4, "nuzzle" should read -- nozzle --.

Signed and Sealed this

Twentieth Day of December, 2005

JON W. DUDAS
*Director of the United States Patent and Trademark Office*